United States Patent [19]

Mochizuki

[11] Patent Number: 4,790,343
[45] Date of Patent: Dec. 13, 1988

[54] PRESSURE REGULATOR

[75] Inventor: Masahiro Mochizuki, Chiryu, Japan

[73] Assignee: Aisin Seiki Kabushiki Kaisha, Kariya, Japan

[21] Appl. No.: 31,266

[22] Filed: Mar. 30, 1987

[30] Foreign Application Priority Data

Mar. 31, 1986 [JP] Japan ............................. 61-47254[U]

[51] Int. Cl.⁴ ............................................. F16K 17/38
[52] U.S. Cl. ......................................... 137/80; 137/79; 137/510; 123/463
[58] Field of Search .................. 137/510, 80; 123/463; 267/167

[56] References Cited

U.S. PATENT DOCUMENTS

| | | | |
|---|---|---|---|
| 2,426,153 | 9/1947 | Mock | 123/463 |
| 4,231,347 | 11/1980 | Ohumi et al. | 137/510 |
| 4,266,520 | 5/1981 | Muller | 123/463 |
| 4,404,944 | 9/1983 | Yamazaki et al. | 123/463 |
| 4,627,463 | 12/1986 | Johnstone | 137/510 |

Primary Examiner—A. Michael Chambers
Attorney, Agent, or Firm—Oblon, Fisher, Spivak, McClelland & Maier

[57] ABSTRACT

A pressure regulator for regulating a pressure differential between a fuel pressure and an intake manifold vacuum, which includes a casing member, a diaphragm dividing the casing member into a vacuum chamber and a fuel pressure chamber, a valve member associated with the diaphragm, and a spring biasing the diaphragm and constructed of a material having a temperature-actuated shape memory alloy.

3 Claims, 3 Drawing Sheets

PRESSURE REGULATOR

BACKGROUND OF THE INVENTION

1. Field of the Invention

This invention relates to pressure regulators in general and more particularly to a pressure regulator wherein a lack of the fuel supply volume can be removed at a high temperature of the engine.

2. Description of the Prior Art

This kind of pressure regulator has been applied to, for example, a fuel supply system. In FIG. 2 illustrating schematically the system, the fuel stored in a fuel tank 1 is pressurized by a fuel pump 2, supplied to an injector 7 through a fuel damper 3 and a fuel filter 4, and injected to an intake manifold 8 from the injector 7. A fuel supply conduit 9 connected to the injector 7 is provided with a branch conduit 9a whose free end is connected with a fuel pressure chamber of a pressure regulator 5'. The pressure regulator is further provided with a vacuum chamber connected with the intake manifold 8 through a conduit 6.

In FIG. 3 showing the structure of a conventional pressure regulator, an interior of a casing member 14 is divided into two chambers by means of a diaphragm 12. One chamber means includes a vacuum chamber 14 a connected with the intake manifold 8 via conduit 10, and the other chamber means includes a fuel pressure chamber 14b connected with the fuel conduit 9.

Interposed within the vacuum chamber 14a is a spring 11' which has a predetermined spring coefficient and biases the diaphragm 12 toward the fuel pressure chamber 14b against the vacuum within the vacuum chamber 14a. The fuel pressure chamber 14b is further connected with a fuel return conduit 15 which returns surplus fuel to the fuel tank 1. The communication between the fuel pressure chamber 14b and the fuel return conduit 15 is controlled by a valve 13' disposed in the diaphragm 12.

Referring to FIG. 2 and FIG. 3, when there are no changes in the vacuum pressure within the intake manifold 8, the fuel pressure in the conduit 9 is maintained at a constant positive value. Under this condition, between the vacuum pressure in the vacuum chamber 14a and the biasing force of the spring 11' a balance is maintained with a constant differential pressure, and therefore the valve 13' is maintained in the closed position thereby preventing the fuel from flowing into the return conduit 15.

When the vacuum pressure of the intake manifold 8 increases and also the vacuum pressure of the pressure regulator 5' increases, the diaphragm 12 will be moved upwardly against the force of the spring 11', thereby opening the valve 13' so that the fuel may be returned from the fuel pressure chamber 14b to the fuel tank 1 through the return conduit 15.

From the above, therefore, it will be seen that the pressure regulator 5' regulates the fuel pressure in response to changes in the vacuum pressure of the intake manifold 8 so that the differential pressure between the vacuum chamber 14a and the fuel pressure chamber 14b may be kept at a constant value so as to stably maintain the fuel supply volume.

Since the fuel supply conduit 9 is inevitably positioned close to the engine, the supply conduit 9 is apt to be under the influence of the heat radiated from the engine and then to be overheated by the radiated heat, whereby a vapor lock is apt to be produced in the conduit 9. Therefore, a predetermined volume of the fuel cannot be supplied to the intake manifold 8, thereby stopping operation of the engine.

In order to avoid the above disadvantages, there is introduced means in which a branch conduit communicating with the atmosphere is newly established in the conduit 6 connecting the intake manifold 8 with the pressure regulator 5', and a thermal responsive valve is further installed in the branch conduit 9a. When an ambient temperature rises beyond a predetermined value, the pressure chamber 14a will be connected with atmosphere by the operation of the thermal responsive valve, whereby the vacuum chamber 14a will be under atmospheric pressure and the fuel pressure of the fuel pressure chamber 14a will increase. Thus, the fuel supply volume can be suitably maintained. If the above technical means is adopted, however, there will be drawbacks in that the construction of the system is complicated, and a fluid leak takes place in the valve of the thermal responsive valve, with the result that productivity will be deteriorated and the fuel supply cannot be controlled with accuracy.

SUMMARY OF THE INVENTION

An object of this invention is to eliminate the disadvantages of prior art pressure regulators.

More specifically, it is an object of this invention to increase the fuel pressure of a fuel pressure chamber at a high temperature so that a fuel supply volume can be properly maintained.

It is another object of this invention to provide a pressure regulator in which a biasing force of a spring disposed in a vacuum chamber will increase when an ambient temperature rises beyond a predetermined value.

It is still another object of this invention to provide a pressure regulator which regulates a pressure differential between the fuel pressure and the intake manifold vacuum and which includes a spring constructed of a material having a temperature-actuated shape memory alloy. The spring will be deformed to be a memorized shape above its transition temperature so that the biasing force of the spring may become large at a high temperature.

Other objects and their attendant advantages will become apparent as the following detailed description of a preferred embodiment taken in conjunction with the accompanying drawings.

DESCRIPTION OF THE PREFERRED EMBODIMENT

Figure 1:
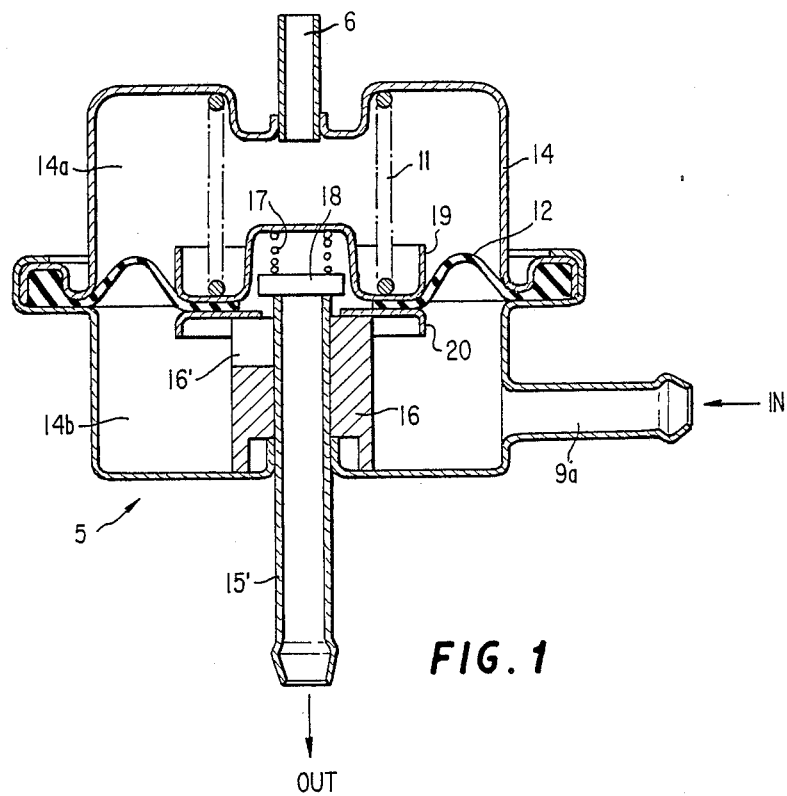
FIG. 1 is a vertical sectional view of a pressure regulator constructed in accordance with an embodiment of the invention.
Figure 2:
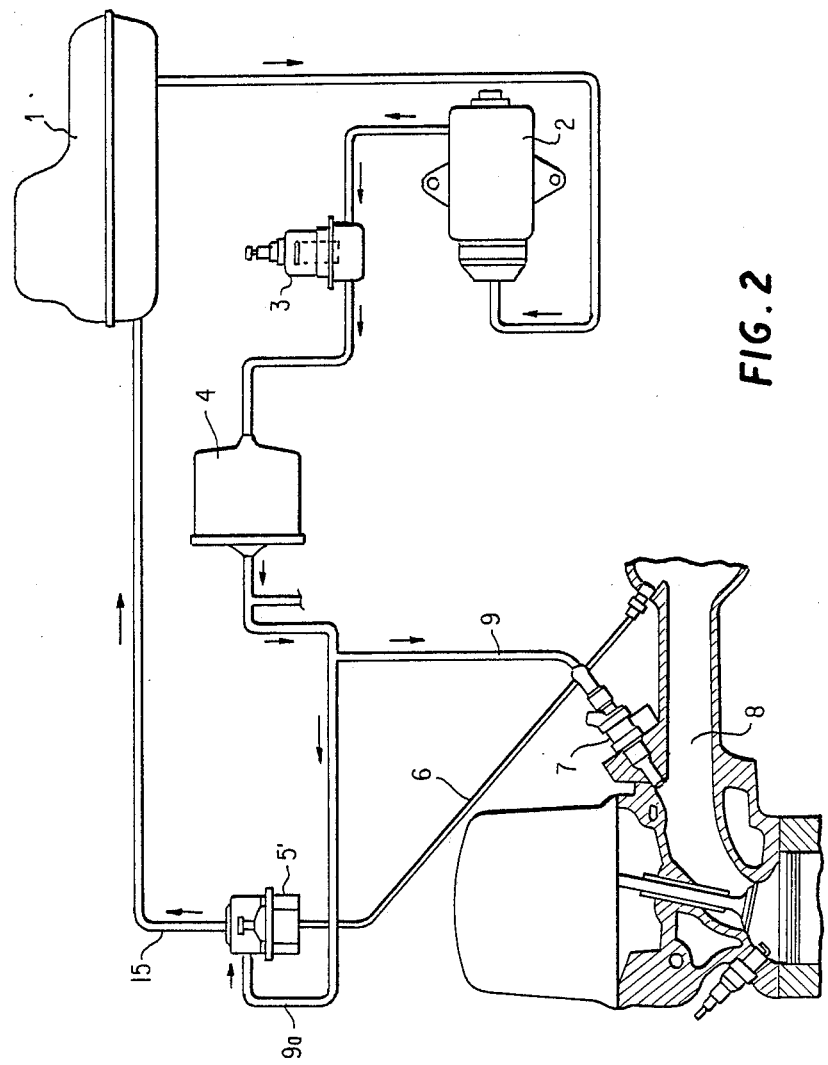
FIG. 2 is a schematic of a fuel supply system incorporating the pressure regulator of FIG. 1.
Figure 3:
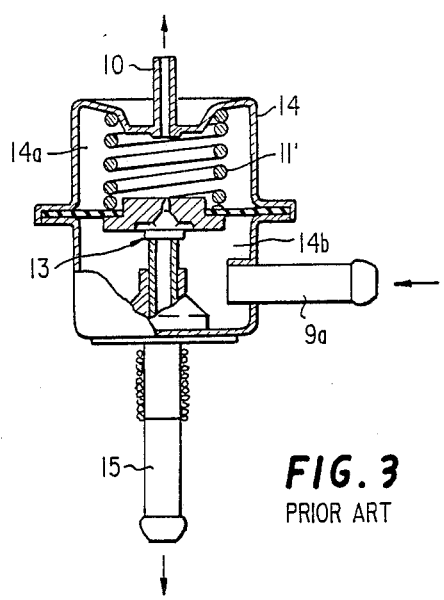
FIG. 3 is a sectional view of a conventional pressure regulator.

Referring now to FIG. 1, there is provided a pressure regulator 5 which includes a casing member 14. An interior portion of the casing member 14 is divided by a flexible diaphragm 12 into a vacuum chamber 14a connected with the intake manifold 8 through a conduit 6 and a fuel pressure chamber 14b connected with a branch conduit 9a. The diaphragm 12 is clamped at the center portion thereof by an upper retainer 19 and a lower retainer 20 which is provided with a centrally located aperture and has a shape of a disk. Interposed between a lower surface of the lower retainer 20 and the casing member 14 is a metallic cylindrical member 16 which is provided with a recess 16' at the upper end thereof and with a conduit member 15' connected with the return conduit 15. Disposed on an upper end of the conduit member 15' is a valve member 18 which is urged by a spring 17 interposed in the upper retainer 19. Interposed between the upper end of the upper retainer 19 and an inner wall surface of the casing member 14 is a coiled spring 11 which is constructed of a material having a temperature-actuated shape memory alloy so that the biasing force of the spring 11 may increase at a high temperature, whereby the spring coefficient of the spring 11 will increase at a high temperature.

In operation, the pressure regulator 5 functions as the conventional pressure regulator 5' under a normal ambient temperature. That is, the spring 11, which is made of a temperature-actuated shape memory alloy and is disposed in the vacuum chamber 14a, keeps its predetermined spring coefficient under which the spring 11 will not return to an original shape. When the vacuum pressure in the vacuum chamber 14a increases, the diaphragm 12 is moved upwardly with the upper and lower retainers 19, 20 against the force of the spring 17. Consequently, the valve member 18 is actuated so as to be in the open position by the fuel pressure in the fuel pressure chamber 14b, whereby the fuel will flow into the return conduit 15 and the fuel pressure in the fuel supply conduit 9 will be reduced. At this time, the pressure differential between the fuel pressure and the intake manifold pressure can be determined by the spring coefficient of the spring 11, thereby keeping the pressure differential continuously constant.

When the engine ambient temperature rises beyond a predetermined value due to an increase in the engine rotational speed, the spring will begin to return to its original shape so that the spring coefficient may increase. At a normal temperature the diaphragm 12 will be moved upwardly due to a small spring coefficient. At a high temperature, however, the spring 11 will prevent the diaphragm 12 from moving upwardly due to a large spring coefficient of the spring 11 even if the intake manifold vacuum increases. As a result, the pressure of the fuel pressure chamber 14b will not change, and thus the differential between the fuel pressure and the intake manifold vacuum will become large.

Figure 4:
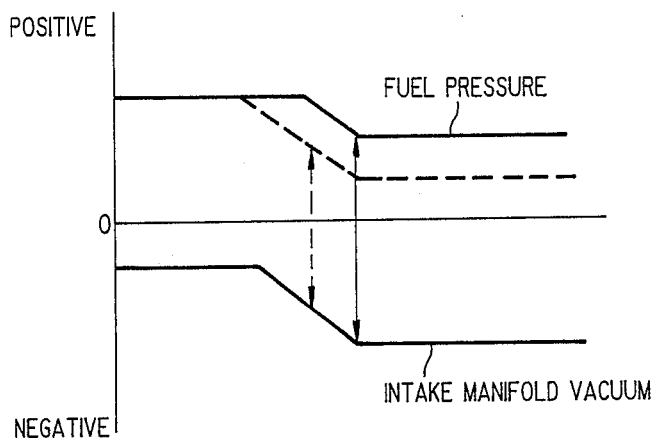
FIG. 4 is a graph of the operation for regulating a differential pressure between at a normal temperature and at a high temperature.

In FIG. 4 showing the above relation, according to the present embodiment shown by a solid line, it is clearly indicated that at a high temperature the degree of increase of the intake manifold vacuum is greater than the degree of decrease of the fuel pressure and that the differential between the fuel pressure and the intake manifold vacuum will become greater than that under normal condition shown by an interrupted line.

Accordingly, even if a vapor lock is produced due to an abnormal high temperature of the fuel supply conduit, the fuel pressure will increase, whereby the fuel supply volume can be properly regulated and stopping of engine operation can be also prevented.

It will be apparent to those skilled in the art that the pressure regulator may be constructed in a variety of ways without, however, departing from the scope and spirit of the appended claims.

What is claimed as new and desired to be secured by letters patent of the United States is:

1. A pressure regulator for regulating a pressure differential between a fuel pressure and an intake manifold vacuum, said regulator comprising:
    a casing member;
    a diaphragm dividing an interior portion of said casing member into a vacuum chamber connected with an engine intake manifold and a fuel pressure chamber connected with a branch conduit of a fuel supply conduit;
    a valve member being associated with said diaphragm and controlling fluid communication between said branch conduit and a return conduit connected with a fuel tank; and
    a coiled spring disposed in said vacuum chamber for biasing said diaphragm and constructed of a material having a temperature-actuated shape memory alloy, said coiled spring expanding to a predetermined shape at high temperature so as to increase a biasing force thereof, wherein said diaphragm is clamped between an upper retainer and a lower retainer; said lower retainer is provided with a centrally located aperture and having a disk shape; and wherein a metallic cylindrical member is interposed between said lower retainer and said casing member and is provided with a conduit member connected with said return conduit.

2. A pressure regulator according to claim 1, wherein said valve member is urged by a spring interposed in said upper retainer.

3. A pressure regulator according to claim 1, wherein said spring includes means for making the degree of increase of the intake manifold greater than the degree of decrease of the fuel pressure and wherein a differential between the fuel pressure and the intake manifold vacuum will become greater than under normal conditions when said coiled spring expands to a predetermined shape at high temperature.

* * * * *

UNITED STATES PATENT AND TRADEMARK OFFICE
CERTIFICATE OF CORRECTION

PATENT NO. : 4,790,343
DATED : DECEMBER 13, 1988
INVENTOR(S) : MASAHIRO MOCHIZUKI

It is certified that error appears in the above-identified patent and that said Letters Patent is hereby corrected as shown below:

In column 2, line 48, before "taken" insert --is--;

line 50, change "DRAWING" to --DRAWINGS--;

line 60, delete "at";

line 61, delete "at".

In column 4, line 5, change "condition" to --conditions--.

Signed and Sealed this

Thirtieth Day of May, 1989

Attest:

DONALD J. QUIGG

Attesting Officer

Commissioner of Patents and Trademarks